April 29, 1941.   C. E. SWENSON   2,240,317
MOTOR CAR DRIVE
Filed Jan. 17, 1938
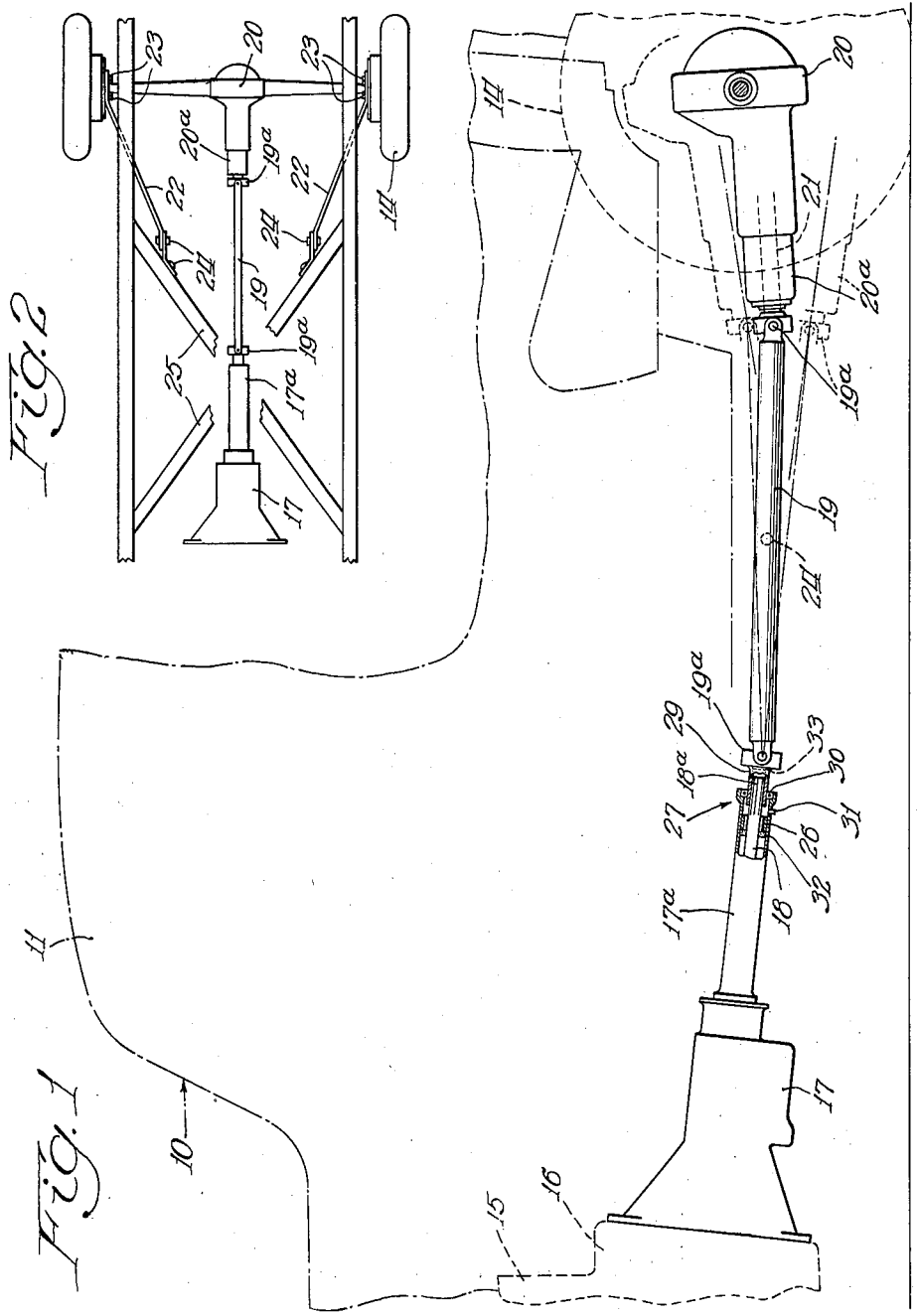
Inventor:
Carl E. Swenson
By: Edward C. Gritzbaugh
Atty.

Patented Apr. 29, 1941

2,240,317

UNITED STATES PATENT OFFICE 2,240,317

MOTOR CAR DRIVE

Carl E. Swenson, Rockford, Ill., assignor to Borg-Warner Corporation, Chicago, Ill., a corporation of Illinois Application January 17, 1938, Serial No. 185,250

6 Claims. (Cl. 180—73)

This invention relates to power transmitting connections for motor vehicles wherein a low center of gravity is of essential importance and more particularly to a novel arrangement of the transmission power shaft, the differential pinion shaft, and the connecting propeller shaft, making possible a lower center of gravity.

The important factors in automotive design including stability, high speed and streamlines, are increasing the demand for lower and lower centers of gravity. Permissible lowering of the top no longer suffices nor do the "hypoid" gear arrangements and the tunneling of the floorboard heretofore used satisfactorily solve the problem. The latter is resorted to as a more common means of lowering the center of gravity, however this tunnel through the middle of the floorboard is definitely objectionable.

I have evolved and it is the object of the present invention to disclose, an improved arrangement of driving connections between the power plant and the wheels, making it possible to considerably lower the entire floorboard, while at the same time, eliminating the objectionable tunnel therein.

More specifically it is an object of the present invention to provide a novel arrangement of the transmission power shaft, differential pinion shaft and connecting propeller shaft; for accomplishing the above results.

Still more specifically it is an object of the present invention to disclose the optimum angular relationship between the transmission power shaft, the differential pinion shaft and the connecting propeller shaft, and further to disclose the provision of means for maintaining this optimum angularity during the relative vertical movement between the transmission and the differential.

The above and other objects, advantages and uses of my invention will become more apparent from a reading of the following specification and claims taken in connection with the appended drawing which forms a part of this specification and wherein:

Fig. 1 is a schematic side elevation showing a vehicle partly in dotted lines provided with a transmission power shaft, propeller shaft and pinion shaft arranged in accordance with the teaching of my invention.

Fig. 2 is a plan view with the body removed showing the relationship of chassis and drive including my novel arrangement of torque arms.

Referring in greater detail of Fig. 1, an automotive vehicle is indicated generally at 10, including a body 11 (indicated in dotted lines) mounted on chassis 12 in turn supported through the usual suspension springs (not shown) on wheels 14. Vehicle 10 is arranged to be motivated by a forwardly mounted internal combustion engine 15 through clutch 16, transmission 17, including power shaft 18 extending therefrom, propeller shaft 19, universal joints 19a and a differential connection to the rear wheels 14 including differential housing 20 and pinion shaft 21.

The above general arrangement so far described is well known and no claim thereto broadly is herein made other than in connection with the improvement hereinafter to be described.

*Drive connection providing lower floor level and lower center of gravity*

I have discovered that a very satisfactory driving connection between the transmission 17 and the differential 20 may be obtained by mounting the transmission housing with the center axis of the power shaft 18 thereof directed downwardly relative to the horizontal at a small acute angle, and by tilting the forward end of pinion shaft 21 so that its center line likewise makes a small acute angle with the horizontal.

More specifically I have found that good operating conditions are obtained where power shaft 18 is inclined relative to the horizontal at an angle of the order of 5½ to 7½ degrees, and forming with the propeller shaft extended an angle of the order of 4 to 6 degrees, preferably 5 degrees, the pinion shaft 21 being likewise positioned to form the same angle with the propeller shaft as formed by the power shaft 18.

While I have found the above specific angular relationships produce good results, it is to be understood that the scope of my invention is not to be rigidly limited thereto, but should be given a scope commensurate with the teachings thereof. The broad and important concept not to be overlooked, is the fact that both the power shaft 18 and the pinion shaft 21 are inclined downwardly at a small acute angle and the center lines thereof intersect at a point intermediate the ends of and below the propeller shaft, with the vehicle standing still.

My invention is further characterized by the fact that standard relatively inexpensive universal joints 19a may be employed while at the same time maintaining a constant one-to-one ratio of velocity between the input power shaft 18 and the output pinion shaft 21. This is accomplished by positioning shaft 18 and shaft 21 at substantially equal angles relative to the propeller shaft and by further providing an arrangement for maintaining this substantial equivalency of angularity throughout the range of relative vertical movement between the transmission housing 17 and the differential housing 20. I have found that this can be accomplished by the provision of torque arms 22 (see Fig. 2), the rear ends of which are non-rotatively attached to housing 20 in any suitable manner as by bolts 23 and the forward ends of which are pivotally attached to the chassis at points 24 positioned intermediate the ends of the propeller shaft. More specifically I have found that optimum results are obtained by locating the forward torque arm pivot at a point midway between the universal joints and on a line bisecting the angle made by the center line of the propeller shaft in its extreme positions. I have found that the pivotal support 24 for the forward ends of torque arms 22 may be mounted to advantage on cross-member 25 of the chassis 12.

Still another very important feature of my invention is the fact that I have provided transmission housing 17 with a rearward extension 17a and further provided differential housing 20 with a forward extension 28, power shaft 18 and pinion shaft 21 being correspondingly increased in length with the very important significant result that the propeller shaft 19 is thus made considerably shorter whereby a high percentage of the objectionable centrifugal effects otherwise present are eliminated.

The usual roller bearing 26 and a slip joint 27 are also provided. While the slip joint 27 may take any of a number of forms, I prefer that it be of the type shown on the drawing and comprising axial splines 18a formed on the rear end of power shaft 18, cooperating with an internally splined sleeve 29 operating in an oil seal 30. Closure plug 31 furnishes a means for introducing the necessary lubricant while packing ring 32 and seal or closure plate 33 together with bearing arrangement 30 function to retain the lubricant within the structure.

*Operation*

The normal stationary position of the above power transmitting connections is shown in full lines in Fig. 1, while the two extreme vertical positions under operating conditions are indicated in dotted lines on the same figure. With the vehicle in operation, slip joint 27 functions to permit relative movement between the end of power shaft 18 and the propeller shaft 19 while torque arms 22 function to vary the angular relationship between power shaft 18, pinion shaft 21 and propeller shaft 19, while at the same time performing the very important function of maintaining the angle defined by the center line of the power shaft with the propeller shaft substantially the same as that defined by the center line of the pinion shaft, thus producing a constant one-to-one ratio between the velocity of input power shaft 18 and output pinion shaft 21, notwithstanding the fact that a common Cardan type universal joint may be employed. This secondary result is very important for reasons including the fact that it saves the expense of providing constant velocity universal joints, which are relatively quite expensive.

While I have described my invention in connection with one specific embodiment thereof it is to be understood that this is by way of illustration and not by way of limitation and that the scope of my invention is defined solely by the appended claims which should be construed as broadly as the prior art will permit.

I claim:

1. In a power transmitting connection for motor vheicles wherein a low floor level is of essential importance, the combination comprising a transmission housing having a drive shaft extending rearwardly therefrom, a rear wheel drive comprising a differential housing carrying a forwardly extending pinion shaft, means connecting said drive shaft and said pinion shaft comprising a propeller shaft, universal joints interposed respectively between the ends of said propeller shaft and said first named shafts, said combination being particularly characterized by said rearwardly extending drive shaft being directed downwardly and said pinion shaft being likewise directed downwardly, the center lines of said first two named shafts extended intersecting one another below and at a point located between the ends of said propeller shaft when said vehicle is at rest, said center lines forming substantially equal angles with the center line of said propeller shaft, and means for maintaining this substantial angular equivalency during the relative vertical movements of said transmission housing and said differential housing under operating conditions.

2. In a power transmitting connection for motor vehicles wherein a low floor level is of essential importance, the combination comprising a transmission housing having a drive shaft extending rearwardly therefrom, a rear wheel drive comprising a differential housing carrying a forwardly extending pinion shaft, means connecting said drive shaft and said pinion shaft comprising a propeller shaft, universal joints interposed respectively between the ends of said propeller shaft and said first named shafts, said combination being particularly characterized by said rearwardly extending drive shaft being directed downwardly and said pinion shaft being likewise directed downwardly; the center lines of said first two named shafts extended intersecting one another below and at a point located between the ends of said propeller shaft when said vehicle is at rest, said center lines forming substantially equal angles with the center line of said propeller shaft, said angles being substantially the same, and being of the order of 4½ to 5½, preferably 5 degrees, and means for maintaining this substantial angular equivalency during the relative vertical movements of said transmission housing and said differential housing under operating conditions.

3. In a power transmitting connection for motor vehicles wherein a low floor level is of essential importance, the combination comprising a transmission housing having a drive shaft extending rearwardly therefrom, a rear wheel drive comprising a differential housing carrying a forwardly extending pinion shaft, means connecting said drive shaft and said pinion shaft comprising a propeller shaft, universal joints interposed respectively between the ends of said propeller shaft and said first named shafts, said combination being particularly characterized by said rearwardly extending drive shaft being directed downwardly and pinion shaft being likewise directed downwardly, the center lines of said first two named shafts extended intersecting one another below and at a point located between the ends of said propeller shaft when said vehicle is at rest, said center lines forming substantially equal angles with the center line of said propeller shaft, and means for maintaining this substantial angular equivalency during the relative vertical movements of said transmission housing and said differential housing under operating conditions, said means comprising at least one torque arm having its rear end non-rotatably associated with said differential housing and its forward end pivotally connected with the chassis at a point intermediate the ends of said propeller shaft.

4. In a power transmitting connection for motor vehicles of the forward power plant rear wheel drive type, wherein a low center of gravity including a low floorboard is of essential importance, the combination comprising a transmission housing having a driving shaft extending rearwardly therefrom, a rear wheel drive comprising a differential housing carrying a forwardly extending pinion shaft, means connecting said drive shaft and said pinion shaft comprising a propeller shaft, universal joints interposed respectively between the ends of said propeller shaft and said first named shafts, the center lines of said first two named shafts extended intersecting one another below and at a point located between the ends of said propeller shaft when said vehicle is at rest, said combination being particularly characterized by said rearwardly extending drive shaft being directed downwardly and extended in length, said pinion shaft being likewise directed downwardly and extended in length, whereby said propeller shaft is made relatively short, thus greatly reducing the objectionable centrifugal effects normally present where a relatively long propeller shaft is used.

5. In a motor vehicle having at one end a power plant and a drive shaft extending therefrom and having at its other end a transverse driving axle and a pinion shaft extending toward said driving shaft and geared to said axle for transmitting drive thereto from said driving shaft, the combination with said drive and pinion shaft of a propeller shaft and a pair of universal joints connecting the respective ends of said propeller shaft to said driving shaft and said pinion shaft respectively, said combination being particularly characterized by said drive shaft being inclined downwardly and extended in length, said pinion shaft being likewise inclined downwardly and extended in length, and said propeller shaft being relatively short, thus greatly reducing the development of objectionable centrifugal effects in said propeller shaft in operation.

6. In a motor vehicle having at one end a power plant and a drive shaft extending therefrom and having at its other end a transverse driving axle and a pinion shaft extending toward said driving shaft and geared to said axle for transmitting drive thereto from said driving shaft, the combination with said drive and pinion shaft of a propeller shaft and a pair of universal joints connecting the respective ends of said propeller shaft to said driving shaft and said pinion shaft respectively, said drive shaft being inclined downwardly and said pinion shaft being likewise inclined downwardly, the extended center lines of said drive and pinion shaft intersecting one another below and at a point located between the ends of said propeller shaft when said vehicle is at rest, said center lines forming substantially equal angles with the center line of said propeller shaft and means for maintaining such substantial angular equivalency during the relative vertical movement of said drive shaft and said pinion shaft during operation.

CARL E. SWENSON.